(12) United States Patent
Gao et al.

(10) Patent No.: US 9,430,356 B2
(45) Date of Patent: Aug. 30, 2016

(54) AUTOMATIC REPAIRS OF SCRIPTS

(71) Applicant: International Business Machines Corporation, Armonk, NY (US)

(72) Inventors: Xue F. Gao, Beijing (CN); Chengen Guan, Beijing (CN); Xiao D. Zhang, Beijing (CN); Hai B. Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 13/934,278

(22) Filed: Jul. 3, 2013

(65) Prior Publication Data

US 2014/0040868 A1 Feb. 6, 2014

(30) Foreign Application Priority Data

Jul. 31, 2012 (CN) .......................... 2012 1 0270593

(51) Int. Cl.
*G06F 9/44* (2006.01)
*G06F 11/36* (2006.01)

(52) U.S. Cl.
CPC ................................. *G06F 11/3612* (2013.01)

(58) Field of Classification Search
CPC .................................................. G06F 11/3612
USPC ........................................................ 717/131
See application file for complete search history.

(56) References Cited

U.S. PATENT DOCUMENTS

| | | | |
|---|---|---|---|
| 5,983,001 A | 11/1999 | Boughner et al. | |
| 8,151,276 B2 | 4/2012 | Grechanik et al. | |
| 2005/0268285 A1 | 12/2005 | Bagley et al. | |
| 2009/0217303 A1* | 8/2009 | Grechanik | G06F 11/3414 719/320 |
| 2009/0288070 A1* | 11/2009 | Cohen | G06F 11/368 717/125 |
| 2010/0318970 A1* | 12/2010 | Grechanik | G06Q 10/06 717/124 |
| 2011/0202901 A1 | 8/2011 | Givoni et al. | |
| 2012/0173998 A1* | 7/2012 | Chaturvedi | G06F 11/368 715/762 |

FOREIGN PATENT DOCUMENTS

| | | |
|---|---|---|
| CN | 101526916 | 9/2009 |
| CN | 102567201 | 7/2012 |
| EP | 2096536 | 9/2009 |
| WO | 2005022409 | 3/2005 |

OTHER PUBLICATIONS

Agarwal, Tarun; A Descriptive Programming Based Approach for Test Automation; 2008 International conference on Computational Intelligence for Modelling Control & Automation; Dec. 10-12, 2008; pp. 152-156.
Kelly, Mike; Introduction to IBM Rational Functional Tester 6.1; IBM developerWorks http://www-130.ibm.com/developerworks; Jun. 13, 2005; 37 pages.
CN Office Action dated Sep. 28, 2015; 201210270593.4, 4 pages.

\* cited by examiner

*Primary Examiner* — Camquy Truong
(74) *Attorney, Agent, or Firm* — Schmeiser, Olsen & Watts, LLP; John Pivnichny

(57) ABSTRACT

A method and associated system for repairing a script. A missed object is detected among one or more objects of the running script, the missed object being unrecognized from an original object of a previous running of the script. A change type of the detected missed object is determined. The script is repaired based on the change type.

17 Claims, 9 Drawing Sheets

AUTOMATIC REPAIRS OF SCRIPTS

TECHNICAL FIELD

The present invention relates to the script test field, and more specifically, to a method and system for automatic repairs upon script test failure.

BACKGROUND

With the rapid development of computer technology and automation technology, conducting automation tests through scripts is a currently popular test approach. Typically a test object map is always associated with a script in an automation test tool. When a tester catches an object by an object finder, the selected object and its hierarchy (including siblings) can be saved in the test object map. However, since a test cycle of the script is usually long and objects in the script might change in the development phase (for example, since research and development staff members revise the script), some objects cannot be recognized any more (missed). Thus, it happens that testers run scripts for a long time but find that most of them fail because individual objects cannot be recognized any more. The failed object recognition blocks all following steps.

In the prior art, there are three common solutions to the above problem: letting research and development staff members inform testers every time and then revise scripts; upon test failure, making comparison by manually catching using tools such as QTP provided by Hewlett-Packard and the like, so as to learn the reasons for the failure; and manually debugging scripts. Obviously these solutions are laborious and time-consuming, which greatly decreases the test efficiency.

BRIEF SUMMARY

The present invention provides a method for repairing a script, comprising:
running, by a processor of a computer system, a script;
said processor detecting a missed object among one or more objects of the running script, said missed object being unrecognized from an original object of a previous running of the script;
said processor determining a change type of the detected missed object; and
said processor repairing the script based on the change type.

The present invention provides a computer program product, comprising a computer readable hardware storage device having computer readable program code stored therein, said program code containing instructions which, upon being executed by a processor of a computer system, implement a method for repairing a script, said method comprising:
said processor running a script;
said processor detecting a missed object among one or more objects of the running script, said missed object being unrecognized from an original object of a previous running of the script;
said processor determining a change type of the detected missed object; and
said processor repairing the script based on the change type.

The present invention provides a computer system comprising a processor, a memory coupled to the processor, and a computer readable hardware storage device coupled to the processor, said storage device containing program code which, upon being executed by the processor via the memory, implements a method for repairing a script, said method comprising:
said processor running a script;
said processor detecting a missed object among one or more objects of the running script, said missed object being unrecognized from an original object of a previous running of the script;
said processor determining a change type of the detected missed object; and
said processor repairing the script based on the change type.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
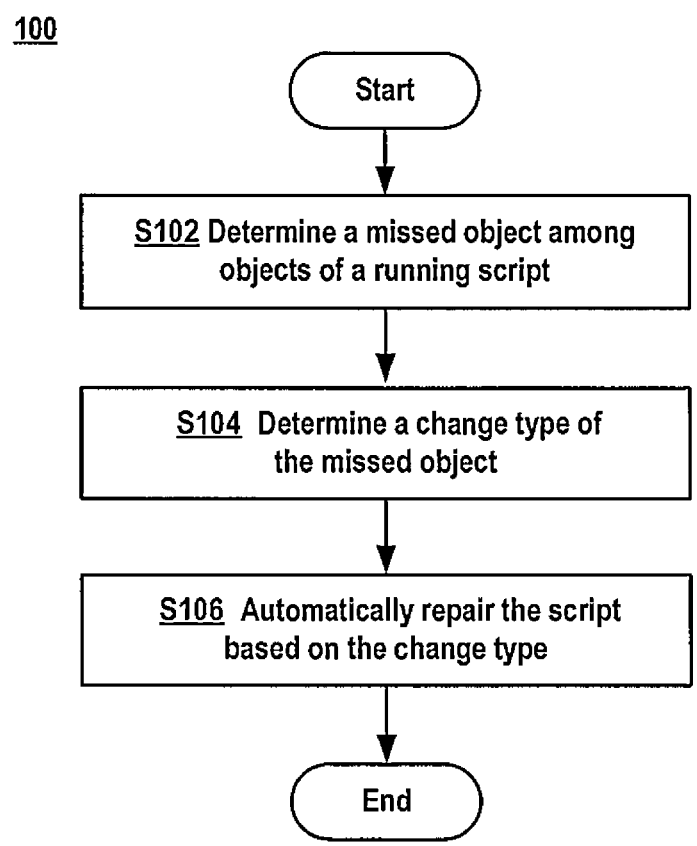
FIG. 1 illustrates a flowchart of a method for automatically repairing a script according to embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

According to one aspect of the present invention, there is provided a method for automatically repairing a script, said method comprising: determining a missed object among one or more objects of a running script; determining a change type of the missed object; and automatically repairing the script based on the change type.

According to another aspect of the present invention, there is provided an apparatus for automatically repairing a script, said apparatus comprising: an object determining module configured to determine a missed object among one or more objects of a running script; a change type determining module configured to determine a change type of the missed object; and a script repairing module configured to automatically repair the script based on the change type.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable hardware medium or device that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a flowchart of a method 100 for automatically repairing a script according to embodiments of the present invention. As shown in FIG. 1, after the method 100 starts, in step S102 a missed object in one or more objects of a running script is determined (i.e., detected) in response to, for example, test failure. The missed object is an object that cannot be recognized any more according to a previous manner in the process of script running There may be various reasons why an object cannot be recognized. For example, besides the change of the recognition property (among one or more properties of an object, the property for recognizing the object) of an object, the change of the class of an object and the change of the hierarchy of an object in an object hierarchical structure, there is further included a reason that an object itself is not changed, but due to the addition of several objects completely the same as this object, this object cannot be recognized uniquely in a previous way.

Next, the method 100 proceeds to step S104 in which a change type of the missed object is determined. As described above, the change type of an object includes, without limitation, recognition property change, class change, hierarchy change, and no change, for example.

Finally, the method 100 proceeds to step S106 in which the script is automatically repaired based on the change type, such that the script may continue to run without blocking following contents. Then, the method 100 ends.

In order to set forth the present invention more clearly, detailed description is presented below to specific implementations of the respective steps of the method 100 through FIGS. 2-6 in conjunction with a concrete example shown in FIG. 7 according to embodiments of the present invention. It should be noted that the specific implementations being described are merely preferable and not intended to limit the present invention to the scope being claimed. Instead, those skilled in the art may use other equivalent approaches to implementing the above steps of the method 100 without departing from the principle and spirit of the present invention.

Figure 2:
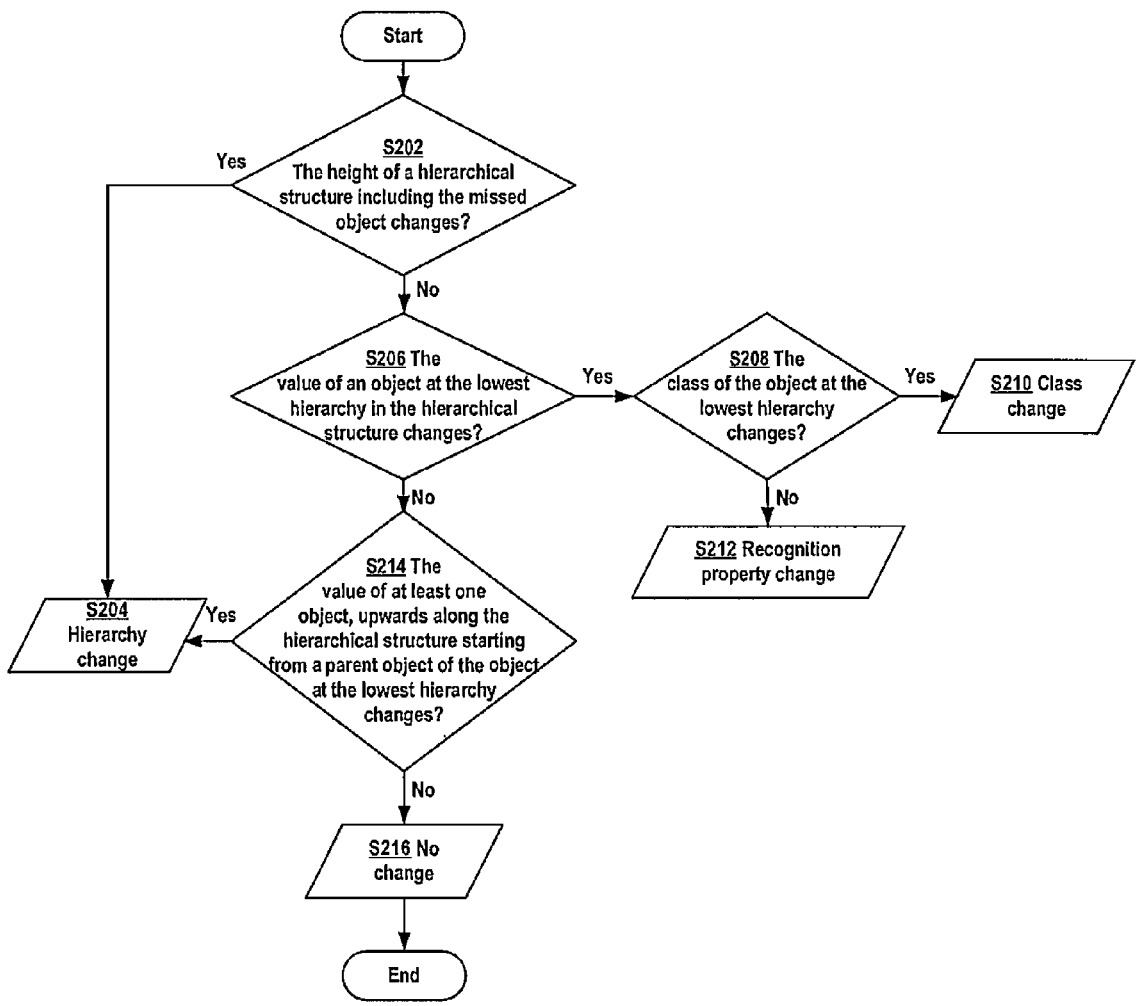
FIG. 2 illustrates a flowchart of a method for determining a change type of the missed object according to embodiments of the present invention.

FIG. 2 illustrates a flowchart of a method 200 for determining a change type of the missed object according to embodiments of the present invention. According to one embodiment of the present invention, as shown in FIG. 2, after the method 200 starts, it proceeds to step S202 first in which it is determined whether the height of a new hierarchical structure including the missed object changes in comparison with an original hierarchical structure including the missed object. The height of a hierarchical structure is the number of hierarchies, or number hierarchical levels, of the hierarchical structure, since each hierarchy of the hierarchical structure is a hierarchical level of the hierarchical structure. Here, the so-called "original hierarchical structure" and "new hierarchical structure" refer to respective hierarchical structures formed by the missed object and one or more objects in a running script before and after the missed object changes. Those skilled in the art should understand that the "new hierarchical structure" may be obtained according to (such as research and development staffs) changed programs or scripts. For example, respective levels of parent objects and one or more child objects of the missed object are fetched from changed programs or scripts, whereby the "new hierarchical structure" is obtained. By referring to an example 700 shown in FIG. 7, 701 is an object hierarchical structure (i.e., original hierarchical structure) among a plurality of object hierarchical structure in a running script before the script changes. For simplicity purposes, suppose objects (i.e., hierarchies) in this hierarchical structure are a0-a3 from top to bottom of the hierarchical structure, respectively, and their corresponding classes are browser, frame, table and button respectively. Suppose a missed object is a2 (whose class is table), and its possible changes include no change (702), recognition property change (703), class change (704) and hierarchy change (705). Those skilled in the art should understand that this is only a simplified example for clarity purposes, and in actual scripts, the number of objects and the number of corresponding classes may be more than those in the above example.

It should be noted that since in the running script there might be a plurality of hierarchical structures including the missed object, the determining of whether the missed object changes and of its change type may be implemented with respect to each of these hierarchical structures. In addition, in the level of data structure, there are various approaches to implementing the determining of whether the missed object changes and of its change type, which typically include stacks. Of course, those skilled in the art should understand that other data structures may also be used for implementing the determining of whether the missed object changes and of its change type.

The present invention marks (i.e., identifies and records in a storage medium or storage device), the change type of the missed object.

Referring back to FIG. 2, in one embodiment of the present invention, responsive to determining that the height of the new hierarchical structure changes (step S202, Yes), the method 200 proceeds to step S204 in which the change type of the missed object is marked as hierarchy change. With reference to FIG. 7, after determining that the height of the hierarchical structure including a2 changes from originally 4 hierarchies (original hierarchical structure: a0-a1- a2-a3) to 3 hierarchies (new hierarchical structure: a0-a2-a3) (705), the change type of the object table is determined as the hierarchy change.

In one embodiment of the present invention, responsive to determining that the height of the new hierarchical structure does not change (step S202, No), the method 200 proceeds to step S206 in which it is further determined whether an object at the lowest hierarchy in the new hierarchical structure changes or not. Responsive to determining that the object at the lowest hierarchy changes (step S206, Yes), the method 200 proceeds to step S208 in which it is further determined whether the class of the object at the lowest hierarchy changes or not. Responsive to determining that the class of the object at the lowest hierarchy changes (step S208, Yes), the method 200 proceeds to step S210 in which the change type of the missed object is marked as class change. In the example shown in FIG. 7, if the class of the object a2 changes from table to list, then the text object type of this object changes accordingly. At this point, during judging the change type of an object, since the height of the hierarchical structure including a2 is 4 still, it is determined whether an object at the lowest hierarchy in this hierarchical structure changes or not. Since the object at the lowest hierarchy changes from originally a3 to a3', it is further determined that the class of a3' changes to text from button of a3. Hence, the change type of the object may be determined as class change.

Still referring to FIG. 2, in one embodiment of the present invention, responsive to determining that the class of the object at the lowest hierarchy does not change (step S208, No), the method 200 proceeds to step S212 in which the change type of the missed object is marked as recognition property change. With reference to 703 in the example of FIG. 7, the initial recognition property of a2 is, for example, its name, and subsequently the name changes to a2'. Hence, when determining the change type of the object, if it is determined that the height of the hierarchical structure including a2 is 4 still and the object a3 at the lowest hierarchy does not change, then the change type of the object a2 may be determined as recognition property change.

With reference to FIG. 2 still, in one embodiment of the present invention, responsive to determining that the object at the lowest hierarchy does not change (step S206, No), the method 200 proceeds to step S214 in which it is determined whether each object changes or not, upwards along the new hierarchical structure starting from a parent object of the object at the lowest hierarchy. Responsive to determining that at least one object changes upwards along the new hierarchical structure (step S214, Yes), the method 200 proceeds to S204 in which the change type of the missed object is marked as hierarchy change. As is clear from the example shown in FIG. 7, another typical case about hierarchy change is as shown in 706, wherein although the height of the hierarchical structure where a2 is located is still 4, actually a2 is not located in the original hierarchical structure; i.e., the hierarchical structure changes. In this case, the method is as below: when determining that the object a3 at the lowest hierarchy does not change, the method traces to each hierarchy of parent object of a3, determining whether it changes or not; when determining that the second hierarchy of parent object of a3 changes from originally a1 to a1', the change type of the object a2 may be marked as hierarchy change.

Returning to FIG. 2, in the optional embodiment of the present invention, after all parent objects are compared, responsive to determining that none of them changes (step S214, No), the method 200 proceeds to step S216 in which the change type of the missed object is marked as no change. In this case, typically an object itself does not change, whereas one or more other objects having the same recognition property (e.g., the same name) are added, at which point the object cannot be uniquely recognized according to the original recognition property. For example, there are multiple a2 in 702 of FIG. 7. Thus, the method 200 ends.

It should be noted that as described above, since there might be a plurality of hierarchical structures including the missed object, there might be a plurality of change types of the object as returned with respect to the respective hierarchical structures, and a final result being returned is, for example, a statistical value of the plurality of change types. In one embodiment, a change type with the largest statistical value is taken as a final change type. In another embodiment, besides a statistical value, other factors are taken into consideration, such as modification habit of research and development staffs, returned test results and so on, so as to determine a final change type of the missed object.

Figure 3:
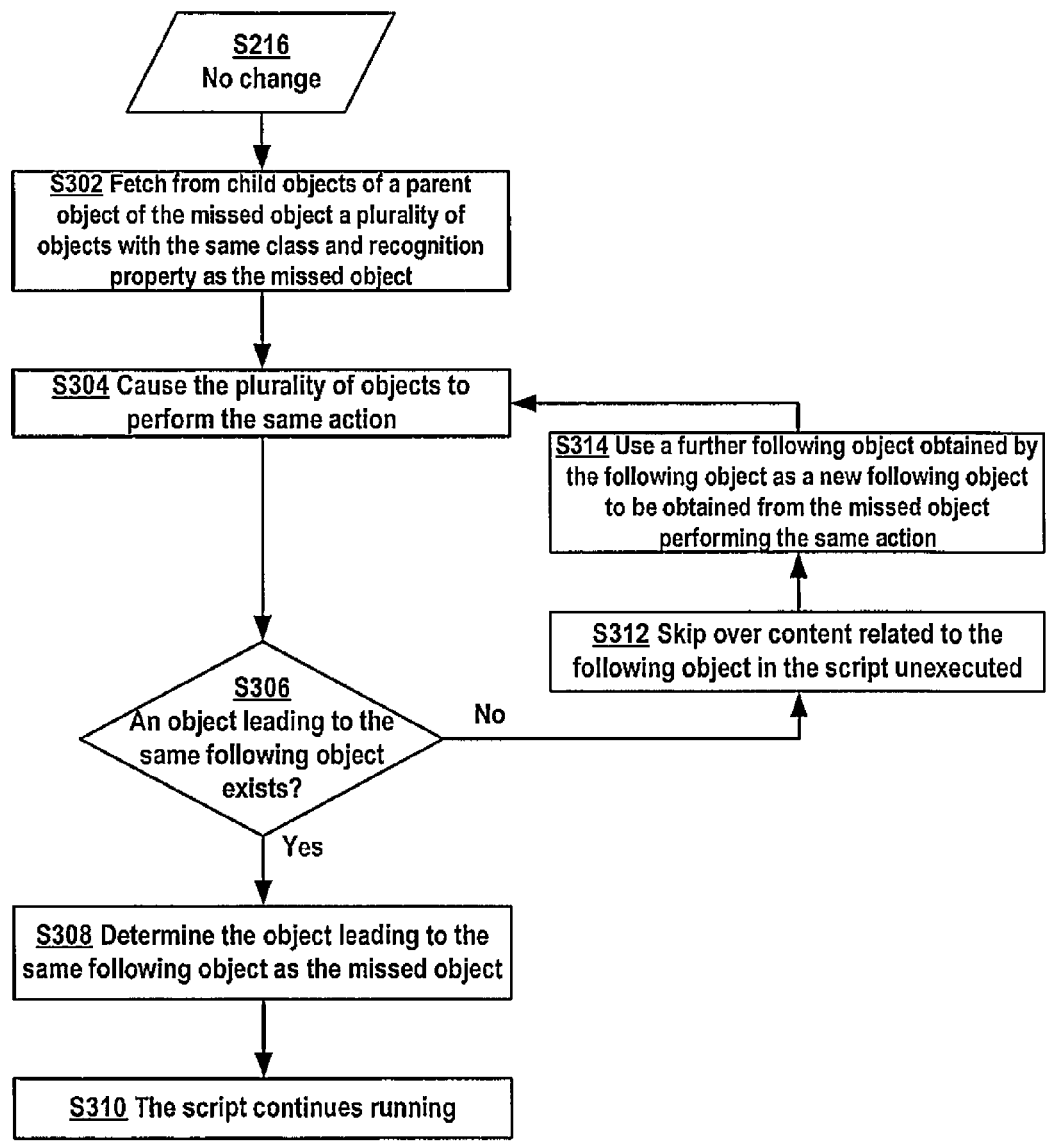
FIGS. 3-6 illustrate flowcharts of methods for automatically repairing a script based on change types of the missed object according to embodiments of the present invention.

FIG. 3 illustrates a flowchart of a method 300 for automatically repairing a test script when determining that the change type of an object is no change, according to embodiments of the present invention. As shown in FIG. 3, responsive to determining that the change type of the missed object is no change (S216), a plurality of objects having the same class and recognition property as the missed object are fetched from a plurality of child objects of the parent object of the missed object (step S302). It should be noted that the term "child objects" include direct child objects and/or indirect child objects throughout the present invention. Next, the "perform the same action-compare" process is implemented, that is, causing all objects to perform the same action (step S304) so as to determine whether a following object fetched is the same as a following object that ought to be fetched from causing the missed object to perform the same action before change; determining an object leading to the same following object (step S306, Yes) as the missed object (step S308), and continuing the script running (step S310). According to an optional embodiment of the present invention, when there is no object leading to the same following object (step S306, No), relevant contents of the following object are skipped over by commenting in the script (step S312). A following object fetched by the following object is used as a new following object fetched (step S314), and the step S304 is repeated until the missed object is found. For example, under the type of no change (702) as shown in FIG. 7, a plurality of a2 are caused to perform the same action so as to determine whether a following object fetched is the original a3 or not; if yes, then the a2 is determined as a target a2, and the script running is continued. If an expected a3 will not be fetched after all a2 perform the same action, then a typical reason is that a3 itself has fault. At this point, relevant content of a3 is skipped over (e.g., by commenting out), and a following object of a3 is used as a following object of a2 (not shown in FIG. 7), and a new round of "perform the same action-compare" process is re-implemented in step S304.

Figure 4:
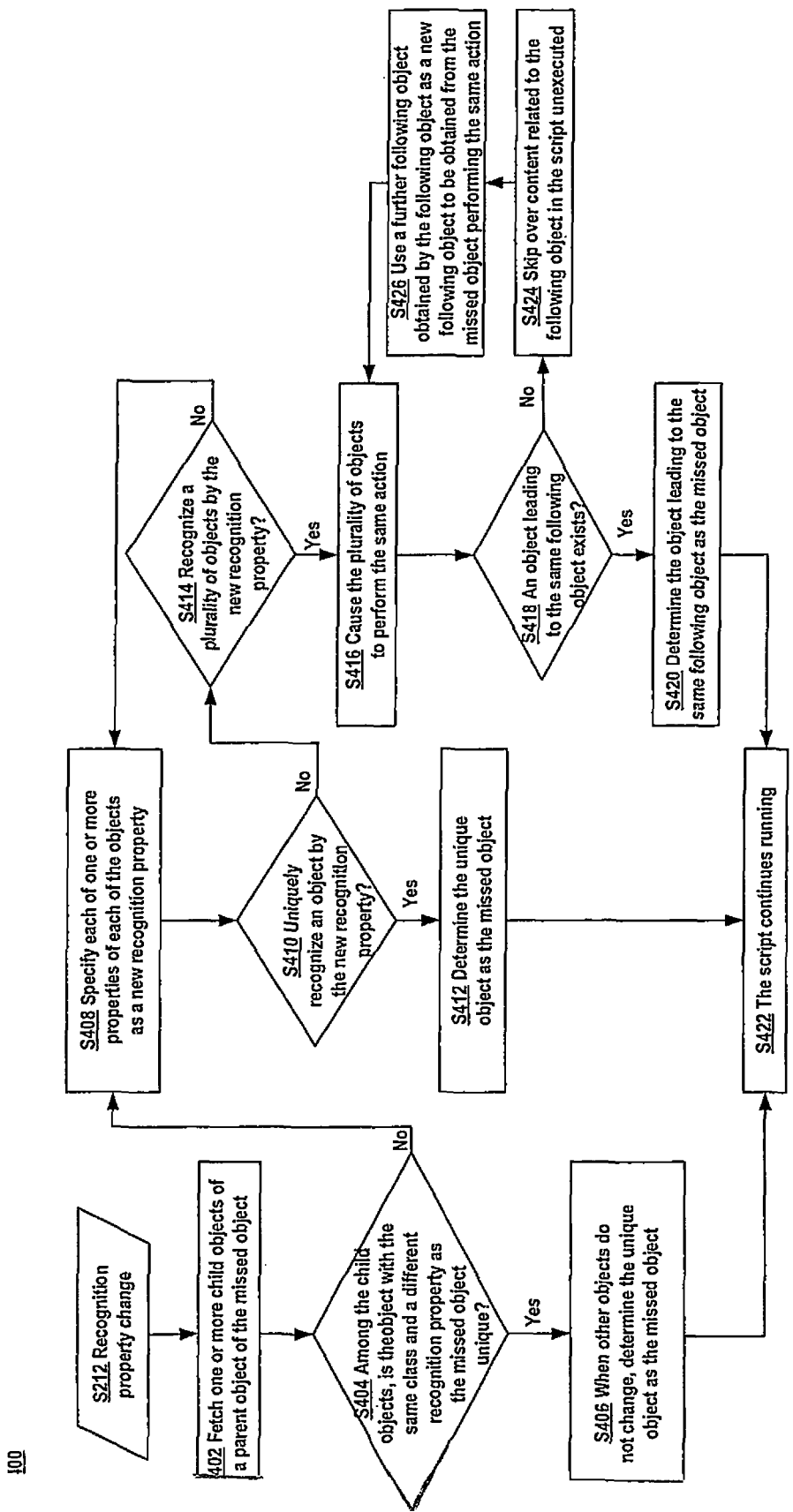

FIG. 4 illustrates a flowchart of a method 400 for automatically repairing a test script when determining that the change type of the missed object is recognition property change, according to embodiments of the present invention. As shown in FIG. 4, the method 400 comprises: responsive to determining that the change type of the missed object is recognition property change (S212), the method 400 proceeds to step S402 in which one or more child objects of the parent object of the missed object are fetched (step S402). When among the one or more child objects there is only one unique object having the same class but a different recognition property with the missed object (step S404, Yes), if other objects do not change, then the unique object is determined as the missed object (step S406), and the script running is continued (step S422). In the context of the example shown in FIG. 7, with reference to 703, if a1 has only one unique child object a2', and a2' has the same class as the original a2 but has a different recognition property (e.g., name), then a2' is determined as the missed object and performs relevant work of a2, and the script running is continued.

In one embodiment of the present invention, the method 400 further comprises: responsive to that among the one or more child objects there are a plurality of objects having the same class but different recognition properties as the missed object (step S404, No), specifying one or more properties of each object in turn as new recognition properties (step S408) until one or more possible target objects are recognized according to the new recognition properties. When a unique object is recognized (step S410, Yes), the unique object is determined as the missed object and caused to perform relevant work of the missed object before being missed, and the script running is continued (step S422). Since the missed object cannot be recognized according to the previous recognition property, the recognition property is changed, trying recognizing the missed object. Those skilled in the art should understand that the specifying one or more properties of each object in turn as new recognition properties may be implemented in various orders, including, without limitation, an order of high-to-low differentiation degrees of objects based on each property.

According to one embodiment of the present invention, the method 400 further comprises: when a plurality of objects are recognized according to the new recognition property (step S414, Yes), implementing the "perform the same action-compare" process formed by steps S304, S306, S312 and S314, is similar to the method 300 shown in FIG. 3; that is, causing all objects to perform the same action (step S416) so as to determine whether a following object fetched is the same as a following object that ought to be fetched from causing the missed object to perform the same action before change; determining an object leading to the same following object (step S418, Yes) as the missed object (step S420), and continuing the script running (step S422). According to one embodiment of the present invention, when there is no object leading to the same following object (step S418, No), relevant content of the following object is skipped over by commenting in the script (step S424). A following object fetched by the following object is used as a new following object fetched (step S426), and the step S416 is repeated tuntil an object leading to the same following object is found.

Figure 5:
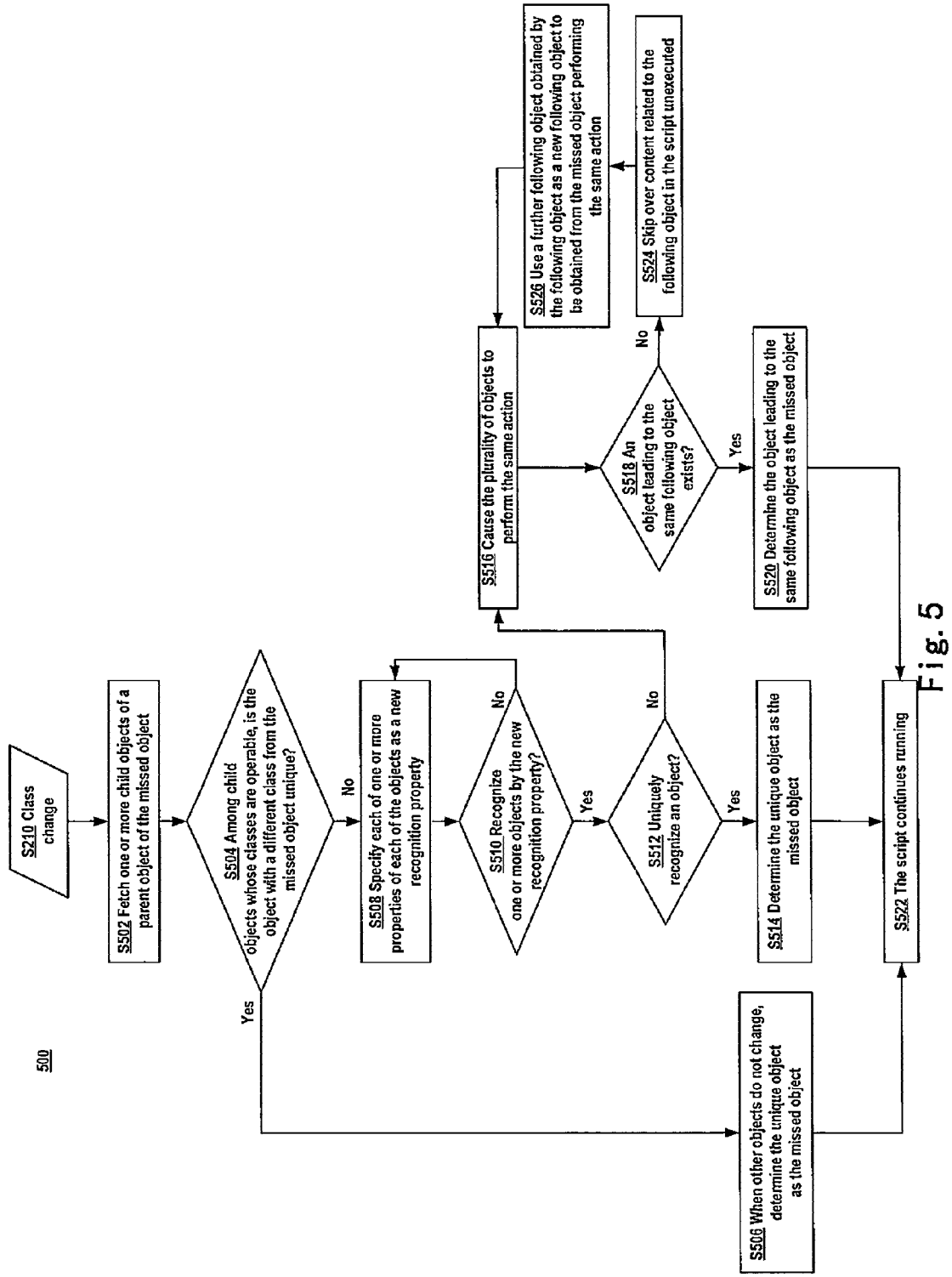

FIG. 5 shows a flowchart of a method 500 for automatically repairing a test script when determining that the change type of the object is class change, according to embodiments of the present invention. As shown in FIG. 5, responsive to determining that the change type of the missed object is class change (S210), one or more child objects of the parent object of the missed object are fetched (step S502); and responsive to that among the one or more child objects there is only one unique object having a different class from the missed object and the class is operable (step S504, Yes), if other objects do not change, the unique object is determined as the missed object (step S506) and caused to perform relevant work before no object is missed, and the script running is continued (step S522). In the context of the example shown in FIG. 7, with reference to 704, since in a1 there is only one object a2 having a different class (list) from the original a2 (whose class is table) and the class is operable, a2 is determined as the target object, and the script running is continued.

In one embodiment of the present invention, the method 500 further comprises: when among the one or more child objects there are a plurality of objects having different classes from the missed object and the plurality of objects are all operable (step S504, No), performing the following steps similar to steps S408-S422 of the method 400 as shown in FIG. 4: for example, specifying, in turn, each of one or more properties of each of the plurality of objects as a new recognition property (step S508) until one or more objects are recognized (step S510, Yes). Of course, those skilled in the art should understand that the specifying, in turn, each of one or more properties of each of the plurality of objects as a new recognition property may be implemented in various orders, including, without limitation, an order of high-to-low differentiation degrees of objects based on each property. Next, when an object is recognized uniquely (step S512, Yes), it is recognized as the missed object (step S514) and caused to perform relevant work before no object is missed, and the script running is continued (step S522). Moreover, responsive to that a plurality of objects are recognized (step S512, No), the flow proceeds to implementing the "perform the same action-compare" process formed by steps S304, S306, S312 and S314, similar to the method 300 shown in FIG. 3; that is, causing the plurality of objects to perform the same action (step S516) so as to determine whether a following object fetched is the same as a following object that ought to be fetched from causing the missed object to perform the same action before change (step S518); determining an object leading to the same following object as the missed object (step S520), and continuing the script running (step S522). According to one embodiment of the present invention, when there is no object leading to the same following object (step S518, No), relevant content of the following object in the script is skipped over unexecuted (step S524). A further following object fetched by the following object is used as a new following object to be fetched from causing the missed object to perform the same action (step S526), and the step S516 is repeated until the missed object is determined.

Figure 6:
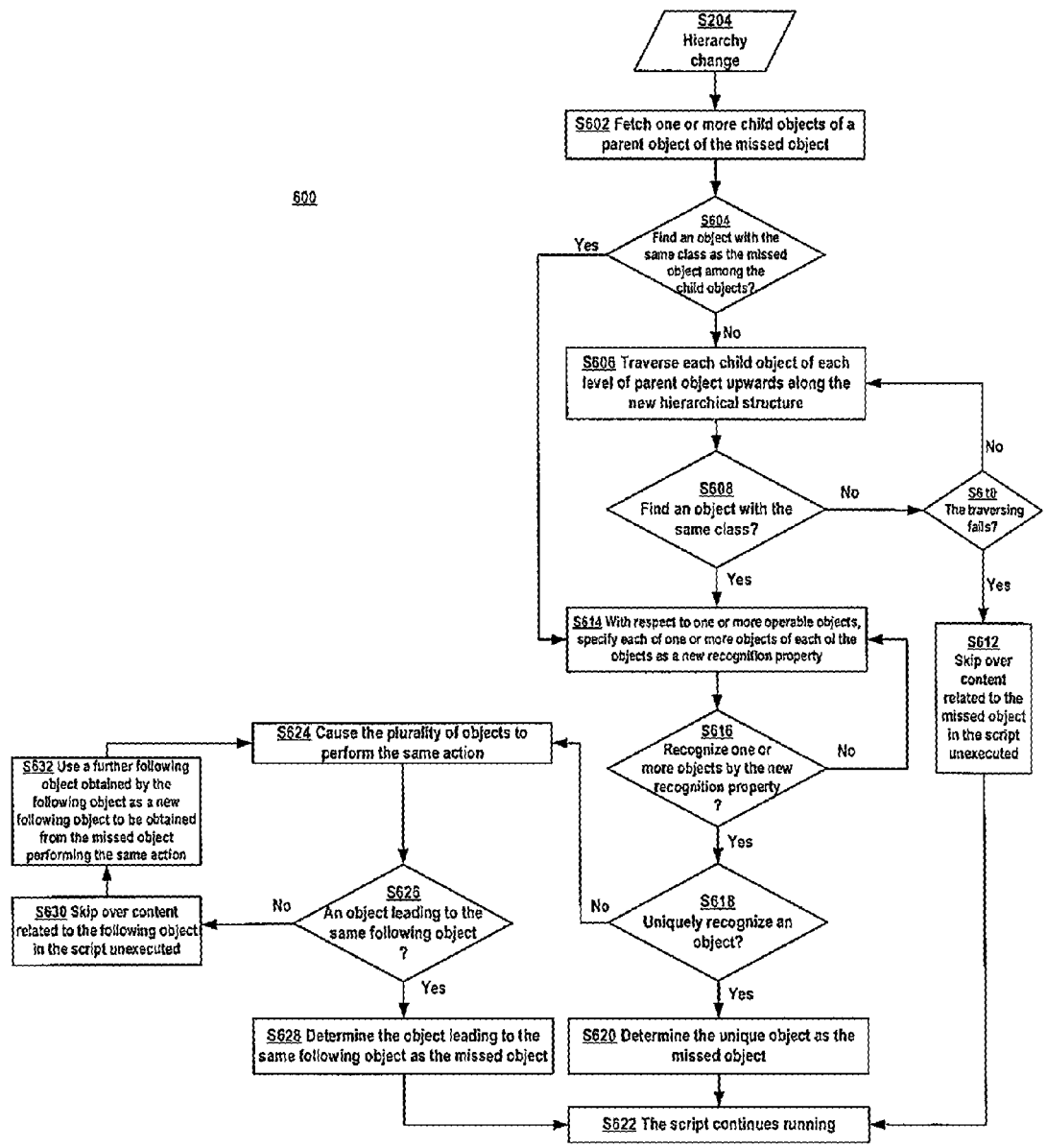
Figure 7:
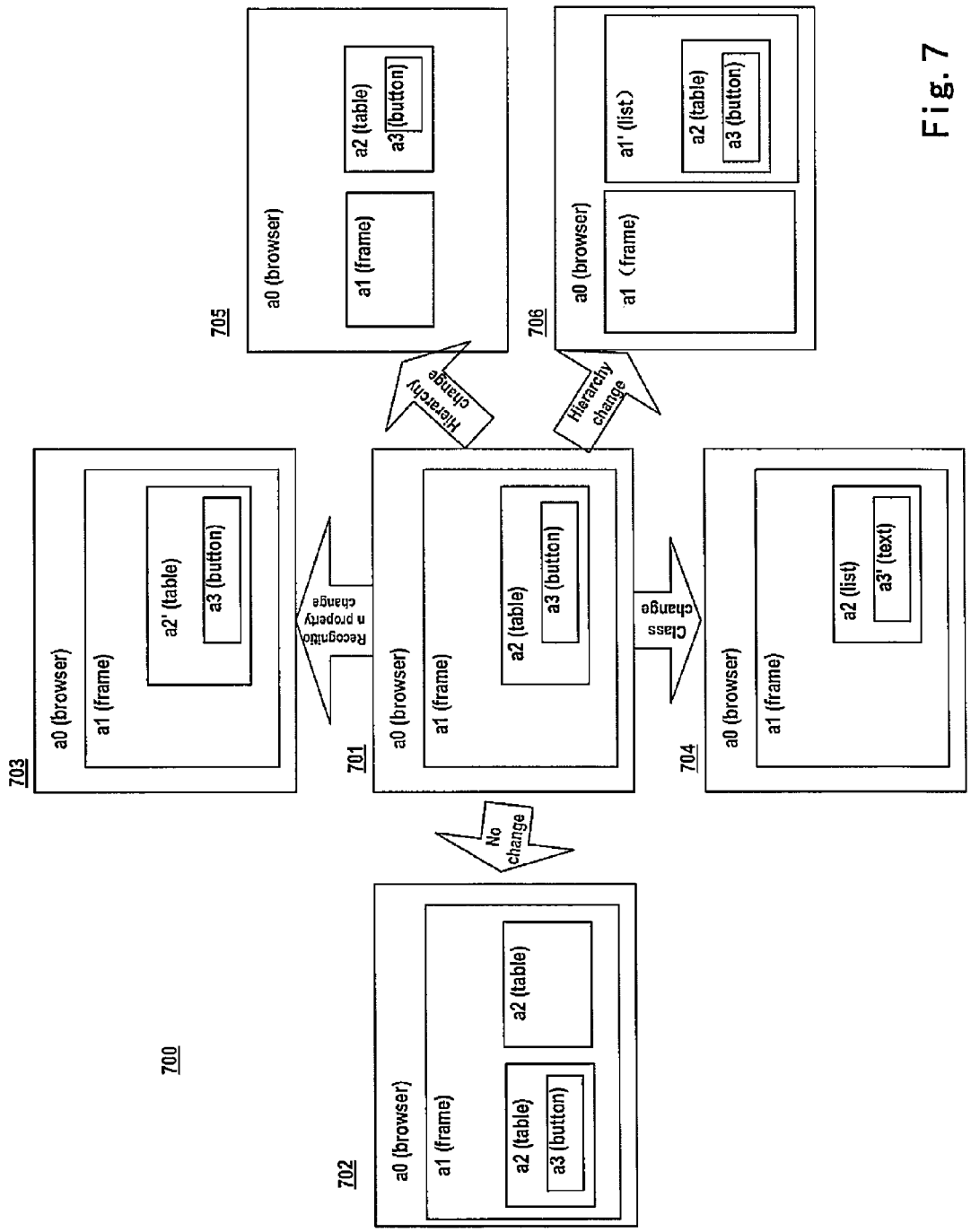
FIG. 7 illustrates a concrete example of changes of the test script according to embodiments of the present invention.

FIG. 6 illustrates a flowchart of a method 600 for automatically repairing a test script when determining the change type of the object is hierarchy change, according to embodiments of the present invention. As shown in FIG. 6, responsive to determining that the change type of the missed object is hierarchy change (S204), one or more child objects (as described above, including direct child objects and indirect child objects) of the parent object (i.e., the first level of parent object of the missed object) of the missed object are fetched (step S602), and an object having the same class as the missed object is looked up in the one or more child objects. In hierarchy change, a typical circumstance is that the missed object is still under the same parent object but not in the original hierarchical structure, so a lookup is first performed among all objects under the same parent object. Upon lookup failure (step S604, No), one or more child objects of each level of the parent object are traversed upward along the new hierarchical structure. That is, first of all, respective child objects of the parent object (the second level of parent object of the missed object) of the parent object of the missed object are traversed, and then, respective child objects of the third level of parent object of the missed object are traversed, . . . , until the object having the same class is found (step S608, Yes) or the traverse fails (step S610, Yes). Still in the context of the example shown in FIG. 7, with reference to the change type 705 as hierarchy change, since a2 is not found among child objects of the original parent object (a1) of a2, the hierarchical structure is traversed upward to look up respective child objects of the second level parent object a0 of a2, at which point a2 is found among direct child objects of a0. The lookup process of 706 is similar to that of 705. That is, when a2 is not found among child objects of the original parent object (a1) of a2, the hierarchical structure is traversed upward to look up respective child objects of the second level of parent object a0 of a2, until a2 is found among the indirect child objects of a0.

In case of traverse failure, relevant content of the missed object in the script is skipped over unexecuted (step S612), while the execution of other content in the script is continued (step S622). This is because that if the missed object is still not found after traverse, then the greatest possibility is the missed object no longer exists. Hence, the execution of the script is continued by skipping over its relevant content unexecuted. As described above, a typical manner of skipping over is commenting out the relevant content of the object. When the one or more objects having the same class are found (step S608, Yes), the following process similar to steps S408-S422 of the method 400 with reference to FIG. 4 is implemented: with respect to one or more operable objects, specifying, in turn, as a new recognition property each of one or more properties of each of the one or more objects having the same class but different recognition properties as the missed object (step S614) until one or more objects are recognized (step S616, Yes); wherein responsive to that an object is recognized uniquely (step S618, Yes), it is recognized as the missed object (step S620) and caused to perform relevant work before no object is missed, and the script running is continued (step S622). Moreover, responsive to that a plurality of objects are recognized (step S618, No), the flow proceeds to implement a process similar to the "perform the same action-compare" process formed by steps S304, S306, S312 and S314 in the method 300 shown in FIG. 3, i.e., causing the one or more objects to perform the same action (step S624) so as to determine whether a following object fetched is the same as a following object that ought to be fetched from causing the missed object to perform the same action before change; determining an object leading to the same following object (step S626, Yes) as the missed object (step S628), and continuing the script running (step S622). According to one embodiment of the present invention, when there is no object leading to the same following object (step S626, No), relevant content of the following object in the script is skipped over unexecuted (step S630). A further following object fetched by executing the following object is used as a new following object to be fetched from causing the missed object to perform the same action (step S632), and the step S624 is repeated until the missed object is determined.

The methods 300-600 described above with reference to FIGS. 3-6 have described corresponding "self-healing" operations that are performed upon script running failure and determination of failure reasons so as to ensure the script will not be blocked at the failure but can continue to run subsequent steps. It should be noted that the respective "self-healing" operations will be recorded (for example, recorded in files) by the system without debugging, whereas the script will not be rewritten based thereon. In one embodiment, a user (e.g., tester) may write all recorded "self-healing" operations to the script one time and compile them together. In another embodiment, the user may for example choose a part of operations to rewrite the script or may not rewrite the script according to actual situations (such as the running situation of the script, the returned test result, etc.).

Figure 8:
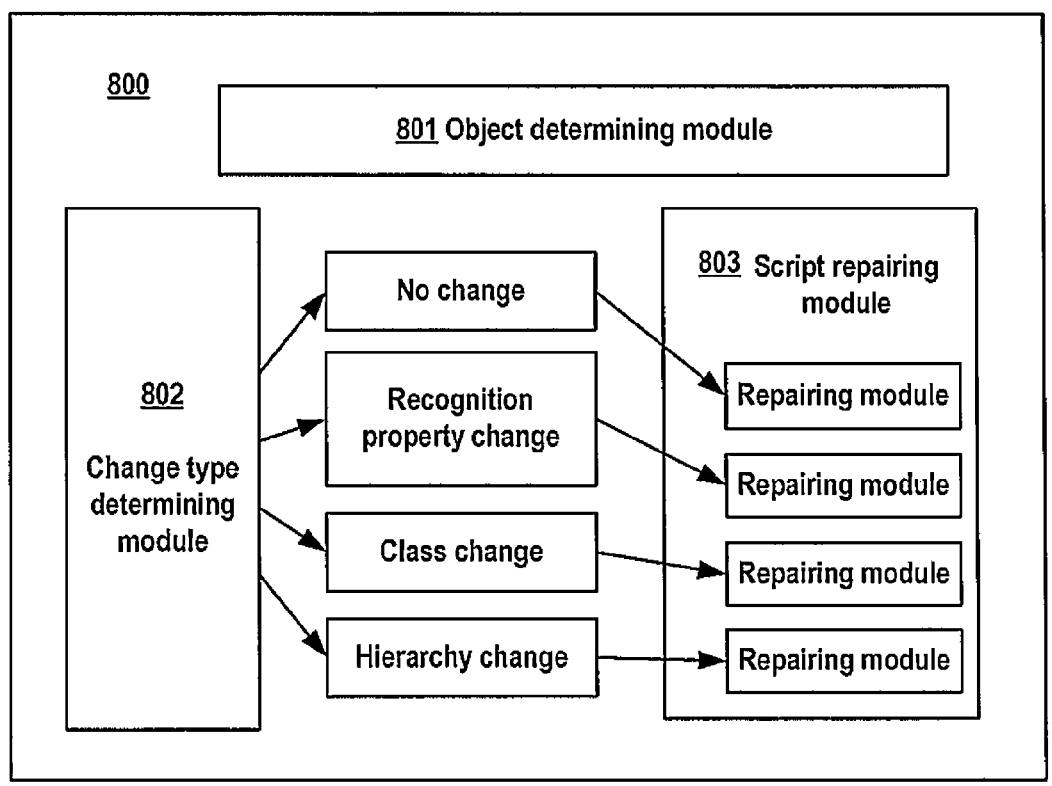
FIG. 8 illustrates a general block diagram of an apparatus for automatically repairing a script according to embodiments of the present invention.

FIG. 8 shows a block diagram of an apparatus 800 for automatically repairing a script according to embodiments of the present invention. The apparatus 800 comprises: an object determining module 801 configured to determine a missed object among one or more objects of a running script; a change type determining module 802 configured to determine a change type of the missed object; and a script repairing module 803 configured to automatically repair the script based on the change type.

In one embodiment of the present invention, the change type determining module 802 comprises: a hierarchy height determining module configured to determine whether the height of a new hierarchical structure including the missed object changes as compared with an original hierarchical structure including the missed object, the original hierarchical structure and the new hierarchical structure being hierarchical structures formed by the one or more objects of the running script together with the missed object before and after the change, respectively; and a first hierarchy change marking module configured to mark the change type of the missed object as hierarchy change (not shown in FIG. 8) in response to determining that the height of the new hierarchical structure changes.

one embodiment of the present invention, the change type determining module 802 further comprises: a lowest hierarchy object determining module configured to, in response to determining that the height of the new hierarchical structure does not change, determine whether an object at the lowest hierarchy in the new hierarchical structure changes; a lowest hierarchy object class determining module configured to, in response to determining that the object at the lowest hierarchy changes, further determine whether a class of the object at the lowest hierarchy changes; and a class change marking module configured to, in response to determining that the class of the object at the lowest hierarchy changes, mark the change type of the missed object as class change (not shown in FIG. 8).

In one embodiment of the present invention, the change type determining module 802 further comprises: a recognition property change marking module configured to, in response to determining that the class of the object at the lowest hierarchy does not change, mark the change type of the missed object as recognition property change (not shown in FIG. 8).

In one embodiment of the present invention, the change type determining module 802 further comprises: an object change determining module configured to, in response to determining that the object at the lowest hierarchy does not change, determine whether each object changes or not, upwards along the new hierarchical structure starting from a parent object of the object at the lowest hierarchy; and a second hierarchy change marking module configured to, in response to determining that at least one object changes, mark the change type of the missed object as hierarchy change (not shown in FIG. 8).

In one embodiment of the present invention, the change type determining module 802 further comprises: a no change marking module configured to, in response to determining that none of the objects changes, mark the change type of the missed object as no change.

In one embodiment of the present invention, the script repairing module 803 comprises: a first fetching module configured to, in response to determining that the change type of the missed object is no change, fetch a plurality of objects with the same class and recognition property as the missed object, from a plurality of child objects of a parent object of the missed object; and a first trying-determining module configured to cause the plurality of objects with the same class and recognition property to perform the same action, determine as the missed object an object obtaining a result that is the same as a result to be obtained from the missed object performing the same action, and continue the script running.

In one embodiment of the present invention, the script repairing module 803 comprises: a second fetching module configured to, in response to determining that the change type of the missed object is recognition property change, fetch one or more child objects of a parent object of the missed object; and a first unique object deciding module configured to, in response to that among the one or more child objects there is only one unique object with the same class and a different recognition property as the missed object, determine the unique object as the missed object and continue the script running, if other objects do not change.

In one embodiment of the present invention, the script repairing module 803 further comprises: a first recognition property specifying module configured to, in response to that among the one or more child objects there are a plurality of objects with the same class and different recognition properties as the missed object, specify, in turn, as a new recognition property each of one or more properties of each of the plurality of objects with the same class and different recognition properties as the missed object until one or more objects are recognized according to the new recognition property; a second unique object deciding module configured to, in response to uniquely recognizing an object, determine the object as the missed object and continue the script running; and a second trying-determining module configured to, in response to recognizing a plurality of objects, cause the plurality of recognized objects to perform the same action, determine as the missed object an object obtaining a result that is the same as a result to be obtained from the missed object performing the same action, and continue the script running.

In one embodiment of the present invention, the script repairing module 803 comprises: a third fetching module configured to, in response to determining that the change type of the object is class change, fetch one or more child objects of a parent object of the missed object; and a third unique object deciding module configured to, in response to that among the one or more child objects there is only one unique object with the same class as the missed object and the class is operable, determine the unique object as the missed object and continue the script running, if other objects do not change.

In one embodiment of the present invention, the script repairing module 803 further comprises: a second recognition property specifying module configured to, in response to that among the one or more child objects there are a plurality of objects with different classes from the missed object and the plurality of objects are all operable, specify, in turn, as a new recognition property each of one or more properties of each of the plurality of objects until one or more objects are recognized; a fourth unique object deciding module configured to, in response to uniquely recognizing an object, recognize the object as the missed object and continue the script running; and a third trying-determining module configured to, in response to recognizing a plurality of objects, cause the plurality of recognized objects to perform the same action, determine as the missed object an object obtaining a result that is the same as a result to be obtained from the missed object performing the same action, and continue the script running In one embodiment of the present invention, the specifying, in turn, as a new recognition property each of one or more properties of each of the plurality of objects is implemented in an order of high-to-low differentiation degrees of objects based on each property.

In one embodiment of the present invention, the script repairing module 803 comprises: a fourth fetching module configured to, in response to determining that the change type of the object is hierarchy change, fetch one or more child objects of a parent object of the missed object; a same-class object determining module configured to look up in the one or more child objects an object with the same class as the missed object; a traversing module configured to, in response to that the lookup fails, traverse one or more child objects of each level of parent object upwards along the original hierarchical structure until the object with the same class is found or the traversing fails; a content skipping over module configured to, in response to that the traversing fails, skip over content related to the missed object in the script unexecuted and continue to execute other content of the script; a third recognition property specifying module configured to, in response to that one or more objects with the same class are found, with respect to one or more operable objects, specify, in turn, as a new recognition property each of one or more properties of each of the one or more objects with the same class and different recognition properties as the missed object, until one or more objects are recognized; a fifth unique object deciding module configured to, in response to uniquely recognizing an object, recognize the object as the missed object and continue the script running; a fourth trying-determining module configured to, in response to recognizing a plurality of objects, cause the plurality of recognized objects to perform the same action, determine as the missed object an object obtaining a result that is the same as a result to be obtained from the missed object performing the same action, and continue the script running.

According to the embodiments of the present invention, in case of test failure during script running, by automatically determining a reason for script failure and automatically repairing the script based on the reason, the script may continue to run without blocking following test steps, whereby a test may be conducted fast and efficiently.

Figure 9:
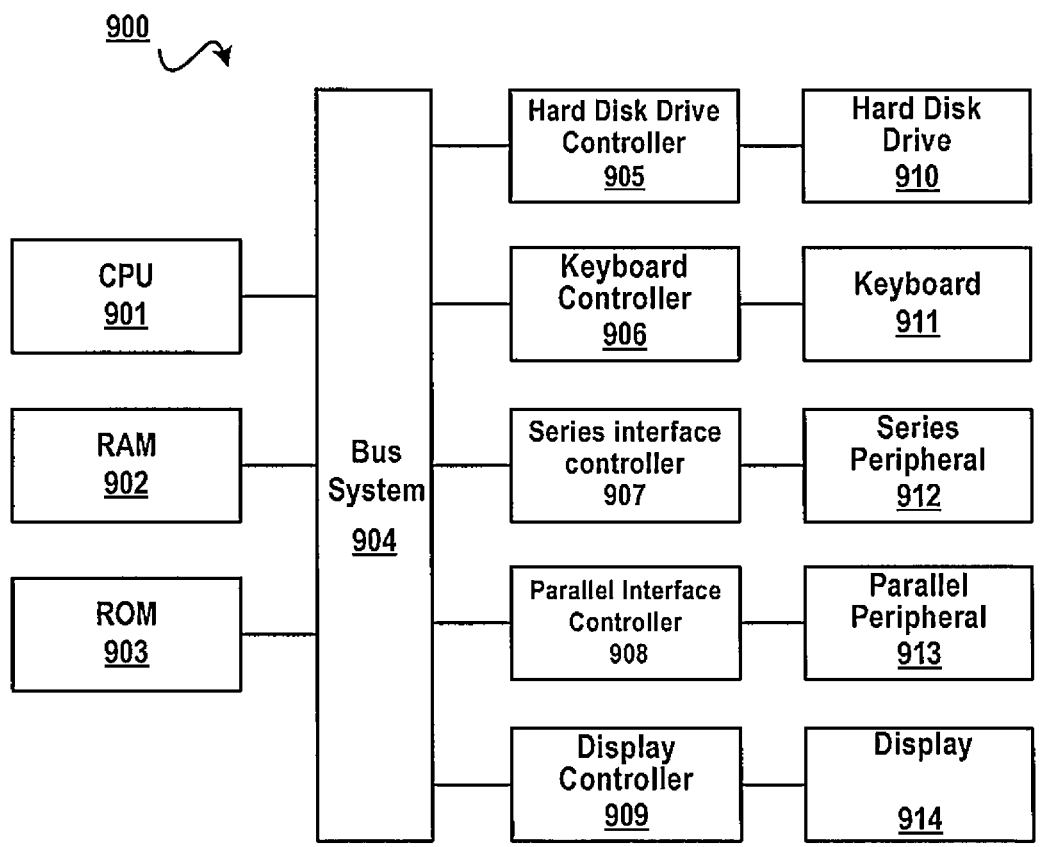
FIG. 9 shows an exemplary computer system which is applicable to implement embodiments of the present invention.

FIG. 9 shows an exemplary computer system 900 which is applicable to implement the embodiments of the present invention. As shown in FIG. 9, the computer system 900 may include: CPU (Central Process Unit) 901, RAM (Random Access Memory) 902, ROM (Read Only Memory) 903, System Bus 904, Hard Drive Controller 905, Keyboard Controller 906, Serial Interface Controller 907, Parallel Interface Controller 908, Display Controller 909, Hard Drive 910, Keyboard 911, Serial Peripheral Equipment 912, Parallel Peripheral Equipment 913 and Display 914. Among above devices, CPU 901, RAM 902, ROM 903, Hard Drive Controller 905, Keyboard Controller 906, Serial Interface Controller 907, Parallel Interface Controller 908 and Display Controller 909 are coupled to the System Bus 904. Hard Drive 910 is coupled to Hard Drive Controller 905. Keyboard 911 is coupled to Keyboard Controller 906. Serial Peripheral Equipment 912 is coupled to Serial Interface Controller 907. Parallel Peripheral Equipment 913 is coupled to Parallel Interface Controller 908. And, Display 914 is coupled to Display Controller 909. It should be understood that the structure as shown in FIG. 9 is only for the exemplary purpose rather than any limitation to the present invention. In some cases, some devices may be added to or removed from the computer system 900 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable hardware medium(s) or device(s) may be utilized. A computer readable hardware storage medium or device may be, for example, but not limited to, an electronic, magnetic, optical, electromagnetic, or semiconductor system, apparatus, or device, or any suitable combination of the foregoing. More specific examples (a non-exhaustive list) of the computer readable hardware storage medium or device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable hardware storage medium or device may be any tangible hardware medium or hardware device that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A computer system of the present invention (e.g., computer system 900) may comprise at least one processor (e.g., CPU 901), at least one memory (e.g., RAM 902) coupled to the processor, and at least one computer readable hardware storage device (e.g., hard disk drive 910) coupled to the processor, wherein the at least one storage device contains program code which, upon being executed by the at least one processor via the at least one memory, implements the methods of the present invention.

A computer program product of the present invention may comprise at least one computer readable hardware storage device (e.g., hard disk drive 910) having computer readable program code stored therein, said program code containing instructions which, upon being executed by at least one processor (e.g., CPU 901) of a computer system (e.g., computer system 900), implement the methods of the present invention. A computer readable storage device of the present invention does not include signal propagation media such as copper cables, optical fibers and wireless transmission media.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some optional implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for repairing a script, comprising:
    running a script, said running the script performed by a processor of a computer system;
    said processor detecting a missed object among one or more objects of the running script, said missed object being unrecognized from an original object of a previous running of the script;
    said processor determining a change type of the detected missed object; and
    said processor repairing the script based on the change type,
    wherein said determining the change type of the missed object comprises:
        determining whether a height of a new hierarchical structure including the missed object has changed as compared with a height of an original hierarchical structure including the original object, said original hierarchical structure and the new hierarchical structure being hierarchical structures formed by the one or more objects of the running script together with the missed object before and after said detecting respectively;
        if it is determined that the height of the new hierarchical structure has changed then marking the change type of the missed object as a hierarchy change;
        if it is determined that the height of the new hierarchical structure has not changed then determining whether a value of an object at a lowest hierarchy in the new hierarchical structure has changed;

if it is determined that the height of the new hierarchical structure has not changed and that the value of the object at the lowest hierarchy in the new hierarchical structure has changed, then determining whether a class of the object at the lowest hierarchy in the new hierarchical structure has changed and if so then marking the change type of the missed object as a class change and if not then marking the change type of the missed object as a recognition property change;

if it is determined that the height of the new hierarchical structure has not changed and that the value of the object at the lowest hierarchy in the new hierarchical structure has not changed, then determining whether at least one object upwards along the new hierarchical structure starting from a parent object at the lowest hierarchy has changed and if so then marking the change type of the missed object as said hierarchy change and if not then marking the change type of the missed object as no change.

2. The method of claim 1, wherein said marking comprises marking the change type of the missed object as no change, and wherein said repairing the script based on the change type comprises:

in response to said marking the change type of the missed object as no change, fetching a plurality of objects with a same class and recognition property as the missed object, from a plurality of child objects of a parent object of the missed object; and causing the plurality of objects with the same class and recognition property to perform a same action, determining as the missed object an object obtaining a result that is the same as a result to be obtained from the missed object performing the same action, and continuing said running the script.

3. The method of claim 1, wherein said marking comprises marking the change type of the missed object as the recognition property change, and wherein said repairing the script based on the change type comprises:

in response to said marking the change type of the missed object as the recognition property change, fetching one or more child objects of a parent object of the missed object; and in response to determining that among the one or more child objects there is only one unique object with a same class and a different recognition property as the missed object and determining that other objects have not changed, determining the unique object as the missed object and continuing said running the script.

4. The method of claim 1, wherein said marking comprises marking the change type of the missed object as the recognition property change, and wherein said repairing the script based on the change type comprises:

in response to said marking the change type of the missed object as the recognition property change, fetching one or more child objects of a parent object of the missed object;

in response to determining that among the one or more child objects there are a plurality of objects with a same class and different recognition properties as the missed object, specifying, in turn, as a new recognition property each of one or more properties of each object of the plurality of objects with the same class and different recognition properties as the missed object until at least one object is recognized according to the new recognition property;

if an object is uniquely recognized, then determining the uniquely recognized object as the missed object and continuing said running the script; and if a plurality of objects is recognized, then causing the objects of the recognized plurality of objects to perform a same action, determining as the missed object an object obtaining a result that is the same as a result that would be obtained from the missed object performing the same action, and continuing said running the script.

5. The method of claim 1, wherein said marking comprises marking the change type of the missed object as the class change, and wherein said repairing the script based on the change type comprises:

in response to determining that the change type of the object is the class change, fetching one or more child objects of a parent object of the missed object; and in response to determining that among the one or more child objects there is only one unique object with the same class as the missed object and the same class is operable and determining that other objects have not changed, determining the unique object as the missed object and continuing said running the script.

6. The method of claim 1, wherein said marking comprises marking the change type of the missed object as the class change, and wherein said repairing the script based on the change type comprises:

in response to determining that the change type of the object is the class change, fetching one or more child objects of a parent object of the missed object;

in response to that among the one or more child objects there are a plurality of objects with different classes from the missed object and the plurality of objects are all operable, specifying, in turn, as a new recognition property each of one or more properties of each of the plurality of objects until one or more objects are recognized;

if an object is uniquely recognized, then determining the uniquely recognized object as the missed object and continuing said running the script; and if a plurality of objects is recognized, then causing the objects of the recognized plurality of objects to perform a same action, determining as the missed object an object obtaining a result that is the same as a result that would be obtained from the missed object performing the same action, and continuing said running the script.

7. The method of claim 1, wherein said marking comprises marking the change type of the missed object as the hierarchy change, and wherein said repairing the script based on the change type comprises:

in response to determining that the change type of the missed object is the hierarchy change, fetching one or more child objects of a parent object of the missed object;

looking up in the one or more child objects in an attempt to find an object with a same class as the missed object;

in response to determining that the lookup fails to find the object with the same class as the missed object, traversing one or more child objects of each level of a parent object upwards along the original hierarchical structure until the object with the same class is found or the traversing fails;

if it is determined that the traversing fails, then skipping over content related to the missed object in the script unexecuted and continuing to execute other content of the script;

if it is determined that the one or more objects with the same class are found, then:

with respect to one or more operable objects, specifying, in turn, as a new recognition property each of one or more properties of each of the one or more objects with the same class and different recognition properties as the missed object, until one or more objects are recognized;

if an object is uniquely recognized, then determining the uniquely recognized object as the missed object and continuing said running the script; and if a plurality of objects is recognized, then causing the objects of the recognized plurality of objects to perform a same action, determining as the missed object an object obtaining a result that is the same as a result that would be obtained from the missed object performing the same action, and continuing said running the script.

8. A computer program product, comprising a computer readable hardware storage device having computer readable program code stored therein, said hardware storage device being entirely hardware, said program code containing instructions which, upon being executed by a processor of a computer system, implement a method for repairing a script, said method comprising:

said processor running a script;

said processor detecting a missed object among one or more objects of the running script, said missed object being unrecognized from an original object of a previous running of the script;

said processor determining a change type of the detected missed object; and said processor repairing the script based on the change type, wherein said determining the change type of the missed object comprises:

determining whether a height of a new hierarchical structure including the missed object has changed as compared with a height of an original hierarchical structure including the original object, said original hierarchical structure and the new hierarchical structure being hierarchical structures formed by the one or more objects of the running script together with the missed object before and after said detecting respectively;

if it is determined that the height of the new hierarchical structure has changed then marking the change type of the missed object as a hierarchy change;

if it is determined that the height of the new hierarchical structure has not changed then determining whether a value of an object at a lowest hierarchy in the new hierarchical structure has changed;

if it is determined that the height of the new hierarchical structure has not changed and that the value of the object at the lowest hierarchy in the new hierarchical structure has changed, then determining whether a class of the object at the lowest hierarchy in the new hierarchical structure has changed and if so then marking the change type of the missed object as a class change and if not then marking the change type of the missed object as a recognition property change;

if it is determined that the height of the new hierarchical structure has not changed and that the value of the object at the lowest hierarchy in the new hierarchical structure has not changed, then determining whether at least one object upwards along the new hierarchical structure starting from a parent object at the lowest hierarchy has changed and if so then marking the change type of the missed object as said hierarchy change and if not then marking the change type of the missed object as no change.

9. The computer program product of claim 8, wherein said marking comprises marking the change type of the missed object as no change, and wherein said repairing the script based on the change type comprises:

in response to said marking the change type of the missed object as no change, fetching a plurality of objects with a same class and recognition property as the missed object, from a plurality of child objects of a parent object of the missed object; and causing the plurality of objects with the same class and recognition property to perform a same action, determining as the missed object an object obtaining a result that is the same as a result to be obtained from the missed object performing the same action, and continuing said running the script.

10. The computer program product of claim 8, wherein said marking comprises marking the change type of the missed object as the recognition property change, and wherein said repairing the script based on the change type comprises:

in response to said marking the change type of the missed object as the recognition property change, fetching one or more child objects of a parent object of the missed object; and in response to determining that among the one or more child objects there is only one unique object with a same class and a different recognition property as the missed object and determining that other objects have not changed, determining the unique object as the missed object and continuing said running the script.

11. The computer program product of claim 8, wherein said marking comprises marking the change type of the missed object as the class change, and wherein said repairing the script based on the change type comprises:

in response to determining that the change type of the object is the class change, fetching one or more child objects of a parent object of the missed object; and in response to determining that among the one or more child objects there is only one unique object with the same class as the missed object and the same class is operable and determining that other objects have not changed, determining the unique object as the missed object and continuing said running the script.

12. The computer program product of claim 8, wherein said marking comprises marking the change type of the missed object as the hierarchy change, and wherein said repairing the script based on the change type comprises:

in response to determining that the change type of the missed object is the hierarchy change, fetching one or more child objects of a parent object of the missed object;

looking up in the one or more child objects in an attempt to find an object with a same class as the missed object;

in response to determining that the lookup fails to find the object with the same class as the missed object, traversing one or more child objects of each level of a parent object upwards along the original hierarchical structure until the object with the same class is found or the traversing fails;

if it is determined that the traversing fails, then skipping over content related to the missed object in the script unexecuted and continuing to execute other content of the script;

if it is determined that the one or more objects with the same class are found, then:
with respect to one or more operable objects, specifying, in turn, as a new recognition property each of one or more properties of each of the one or more objects with the same class and different recognition properties as the missed object, until one or more objects are recognized;
if an object is uniquely recognized, then determining the uniquely recognized object as the missed object and continuing said running the script; and
if a plurality of objects is recognized, then causing the objects of the recognized plurality of objects to perform a same action, determining as the missed object an object obtaining a result that is the same as a result that would be obtained from the missed object performing the same action, and continuing said running the script.

13. A computer system comprising a processor, a memory coupled to the processor, and a computer readable hardware storage device coupled to the processor, said storage device containing program code which, upon being executed by the processor via the memory, implements a method for repairing a script, said method comprising:
said processor running a script;
said processor detecting a missed object among one or more objects of the running script, said missed object being unrecognized from an original object of a previous running of the script;
said processor determining a change type of the detected missed object; and
said processor repairing the script based on the change type,
wherein said determining the change type of the missed object comprises:
determining whether a height of a new hierarchical structure including the missed object has changed as compared with a height of an original hierarchical structure including the original object, said original hierarchical structure and the new hierarchical structure being hierarchical structures formed by the one or more objects of the running script together with the missed object before and after said detecting respectively;
if it is determined that the height of the new hierarchical structure has changed then marking the change type of the missed object as a hierarchy change;
if it is determined that the height of the new hierarchical structure has not changed then determining whether a value of an object at a lowest hierarchy in the new hierarchical structure has changed;
if it is determined that the height of the new hierarchical structure has not changed and that the value of the object at the lowest hierarchy in the new hierarchical structure has changed, then determining whether a class of the object at the lowest hierarchy in the new hierarchical structure has changed and if so then marking the change type of the missed object as a class change and if not then marking the change type of the missed object as a recognition property change;
if it is determined that the height of the new hierarchical structure has not changed and that the value of the object at the lowest hierarchy in the new hierarchical structure has not changed, then determining whether at least one object upwards along the new hierarchical structure starting from a parent object at the lowest hierarchy has changed and if so then marking the change type of the missed object as said hierarchy change and if not then marking the change type of the missed object as no change.

14. The computer system of claim 13, wherein said marking comprises marking the change type of the missed object as no change, and wherein said repairing the script based on the change type comprises:
in response to said marking the change type of the missed object as no change, fetching a plurality of objects with a same class and recognition property as the missed object, from a plurality of child objects of a parent object of the missed object; and
causing the plurality of objects with the same class and recognition property to perform a same action, determining as the missed object an object obtaining a result that is the same as a result to be obtained from the missed object performing the same action, and continuing said running the script.

15. The computer system of claim 13, wherein said marking comprises marking the change type of the missed object as the recognition property change, and wherein said repairing the script based on the change type comprises:
in response to said marking the change type of the missed object as the recognition property change, fetching one or more child objects of a parent object of the missed object; and
in response to determining that among the one or more child objects there is only one unique object with a same class and a different recognition property as the missed object and determining that other objects have not changed, determining the unique object as the missed object and continuing said running the script.

16. The computer system of claim 13, wherein said marking comprises marking the change type of the missed object as the class change, and wherein said repairing the script based on the change type comprises:
in response to determining that the change type of the object is the class change, fetching one or more child objects of a parent object of the missed object; and
in response to determining that among the one or more child objects there is only one unique object with the same class as the missed object and the same class is operable and determining that other objects have not changed, determining the unique object as the missed object and continuing said running the script.

17. The computer system of claim 13, wherein said marking comprises marking the change type of the missed object as the hierarchy change, and wherein said repairing the script based on the change type comprises:
in response to determining that the change type of the missed object is the hierarchy change, fetching one or more child objects of a parent object of the missed object;
looking up in the one or more child objects in an attempt to find an object with a same class as the missed object;
in response to determining that the lookup fails to find the object with the same class as the missed object, traversing one or more child objects of each level of a parent object upwards along the original hierarchical structure until the object with the same class is found or the traversing fails;
if it is determined that the traversing fails, then skipping over content related to the missed object in the script unexecuted and continuing to execute other content of the script;

if it is determined that the one or more objects with the same class are found, then:
- with respect to one or more operable objects, specifying, in turn, as a new recognition property each of one or more properties of each of the one or more objects with the same class and different recognition properties as the missed object, until one or more objects are recognized;
- if an object is uniquely recognized, then determining the uniquely recognized object as the missed object and continuing said running the script; and
- if a plurality of objects is recognized, then causing the objects of the recognized plurality of objects to perform a same action, determining as the missed object an object obtaining a result that is the same as a result that would be obtained from the missed object performing the same action, and continuing said running the script.

\* \* \* \* \*